Jan. 13, 1942.    G. A. TINNERMAN    2,270,153
TOOL
Filed Jan. 24, 1941
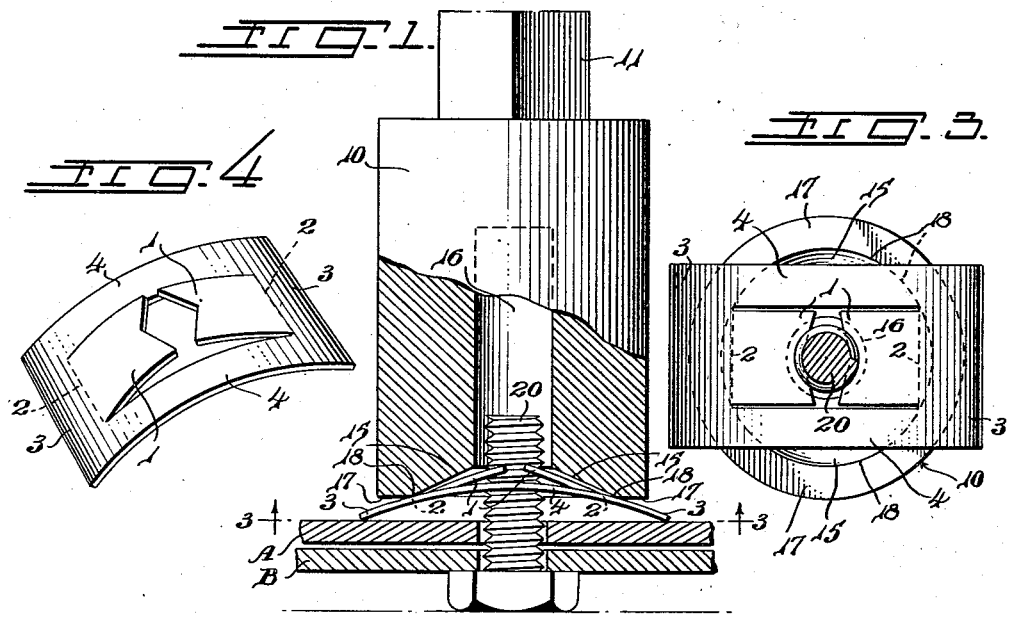
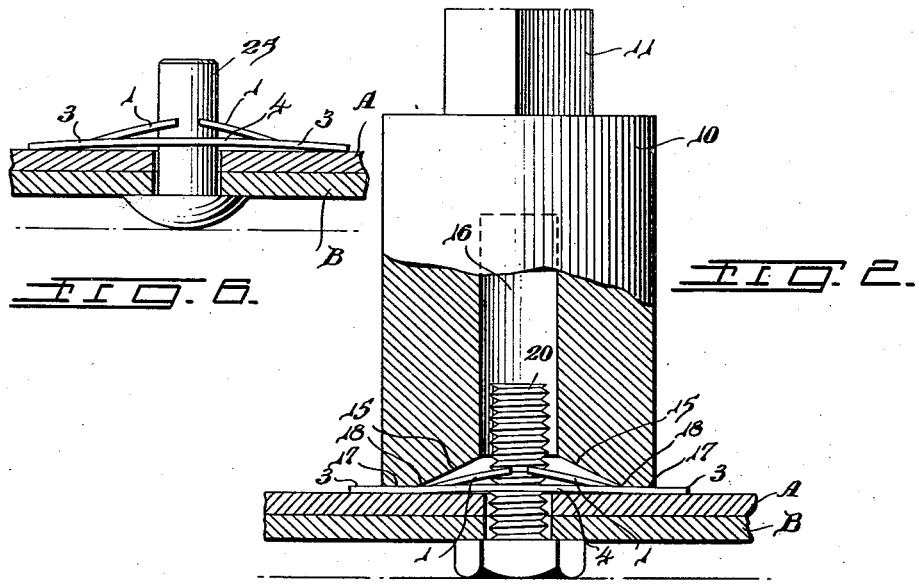
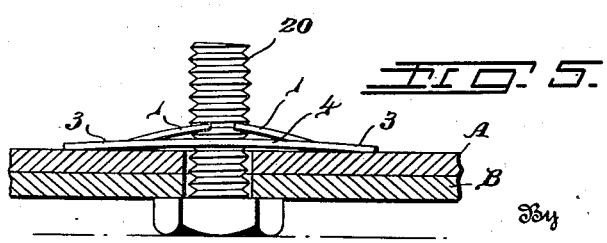
Inventor:
GEORGE A. TINNERMAN
By H. G. Lombard,
Attorney Patented Jan. 13, 1942

2,270,153

UNITED STATES PATENT OFFICE 2,270,153

TOOL

George A. Tinnerman, Cleveland, Ohio, assignor to Tinnerman Products, Inc., Cleveland, Ohio, a corporation of Ohio Application January 24, 1941, Serial No. 375,355

1 Claim. (Cl. 81—3)

This invention deals with an improved tool for use with sheet metal or spring nut devices in applying the same to locked fastening engagement on a threaded bolt or stud in a minimum of time and effort.

More particularly, the invention is directed to a tool which may be applied, in any position, to a sheet metal or spring nut device for easily and quickly advancing the same to fastening position on a bolt or stud by a substantially axial thrust-like movement for locking the spring nut in such fastening position and providing a rigid, tight installation of the parts secured under continuously effective spring tension.

Sheet metal or threadless spring nut devices with which the tool of the instant invention is employed are constructed of relatively thin sections of any suitable sheet metal, usually in the form of a heat-treated and tempered spring metal body provided with cooperating tongues or similar bolt engaging means struck and formed therefrom to project out of the plane thereof for engaging threadedly the threads of a bolt or screw or having biting engagement with the shank of a threadless stud, rivet, or the like, under spring tension. Certain forms of such nut devices comprise end and bridge portions defining a generally arched or concavo-convex body with the tongues projecting upwardly therefrom between the side or bridge portions. Due to the inherent resiliency of the spring metal and the manner in which the tongues are provided, such spring nut devices are capable of an easy, quick assembly onto a bolt or stud by a substantially axial thrust and ratchet-like action of the tongues with the cooperating shank element. However, on being so applied, in order to provide a locked and rigid fastening engagement preventing accidental loosening, it is necessary to subject the spring nut to a tensioning operation, which, in the case of a threaded bolt, disposes the tongues of the spring nut in tensioned fastening engagement with the lowermost effective thread of the bolt adjacent the work, and, in the case of a threadless stud or rivet, causes the extremities of the tongues to bite into and become embedded in the shank of the stud and thus locked in finally applied fastening position.

Heretofore, certain methods to obtain such tensioned fastening engagement of a spring nut on a bolt or stud, have involved the use of a tool in the form of a substantial yoke comprising a pair of arms which contact the spring tongues on either side of the bolt to force them, in a ratchet-like action, to fastening engagement with the lowermost thread of the bolt. This procedure has been found impractical in many instances because the tongues of the spring nuts do not tend to snap freely over the threads of the bolt or screw, and also, in that the tongues necessarily are deformed upwardly in concave, bowed relation relative to the body of the nut to the extent that the extremities thereof are disposed out of most effective contact with the bolt threads. The tongue extremities, therefore, often tend to slip over or climb into the next thread under strain and vibration of the parts secured to render the spring nut inefficient and loose in fastening position on the bolt.

In another application, spring nuts of the character referred to, are employed with threadless shank elements such as nails or rivets. And it has been found that any substantial pressure exerted on the tongues of a spring nut prevents the same from being advanced to tightened, fastening engagement against the work since such pressure prevents the tongues from yielding as necessary to permit the extremities thereof to slide easily on the threadless shank to the position of most effective fastening engagement.

Accordingly, it will be appreciated that in order to obtain the most effective and practical results, a tool for applying spring nuts to locked fastening engagement on a bolt or stud is so designed as to compress a spring nut at points other than the tongues or similar bolt engaging means in a manner whereby such tongues may engage the bolt or stud without being deformed or mutilated out of most effective fastening engagement therewith. As shown in prior Patent Number 2,137,929, for example, in many applications, such a tool is best provided in the manner of spaced head elements which straddle the tongues of a spring nut and otherwise engage the longitudinal edges thereof in order that the spring nut may be subjected to a turning movement relative to the associated stud to tighten the same as necessary or desirable.

However, a tool of this character requires a slight delay to fit the same properly to the spring nut for use in the manner intended and, if such slight delay may be eliminated, there is obtained a considerable saving, over a period of time, from the standpoint of speed and economy in mass production methods of assembly. This is true, especially, in the event the tool is employed in an assembling machine and actuated by the ram or plunger thereof to advance a spring nut to applied fastening position on a supported bolt or stud by substantially direct axial thrust, or the like.

A primary object of the present invention, therefore, is to provide a tool which requires no particular precaution to fit the same to a spring nut in any certain way to tension the same in the aforesaid preferred method but rather, may be applied to the spring nut at random, in any convenient or desired operative position for proper and effective use in the speediest possible manner. This, accordingly, permits an assembling operation to be performed in the easiest and simpliest way and in the least amount of time and effort, whether by hand or machine, to provide an important saving in the cost of labor while otherwise advantageously expediting the quantity production of an assembly.

Thus, in the application of a spring nut employed with a threaded bolt, the tool of the present invention is designed to be applied to the spring nut in any position and exert pressure thereon at points other than the tongues thereof to actually tension the spring nut in fully tightened fastening position with the bolt and with the tongues or bolt engaging elements thereof disposed in proper and most effective locked, threaded engagement with the lowermost effective thread of the bolt adjacent the work, and otherwise exerting an axial drawing action on the bolt to provide a tight, rigid installation of the parts secured.

Similarly, in the case of a threadless stud, the pressure on the spring nut is applied, likewise, at points other than the tongues, and in a manner to tension the body of the spring nut, such that upon removal of the tool and withdrawal of pressure therefrom, the spring nut attempts to assume its initial, generally arched configuration causing the extremities of the tongues to move toward each other to become embedded in the shank of the stud in substantially equal, locking biting engagement therewith and otherwise exerting an axial drawing action on said stud, as aforesaid.

Another, more specific object of the invention is to provide a tool of the kind described for tensioning a spring nut, comprising, a tool head having a simple tapering recess, or the like, defining an inclined wall and a peripheral head portion adjacent said wall which may be applied to engage the generally concave base of a spring nut in any position while otherwise clearing the tongues or stud engaging elements of the spring nut to compress and tension the same without exerting any such pressure on said tongues or stud engaging elements which would cause a deformation or mutilation thereof out of most effective fastening engagement with the associated bolt or stud.

A further principal purpose of the present invention is to provide such a tool which is designed to advance a spring nut device easily and quickly to locked fastening engagement on a threaded bolt or screw in a direct axial, thrust-like motion without stripping the threads thereof or deforming the extremities of the tongues or other thread engaging means of the spring nut out of uniform threaded engagement with the bolt or screw.

A still further object of the invention contemplates the provision of a tool of this character provided with means having such contact and cooperative engagement with the elements of a spring nut, as to force the same to locked fastening engagement with the lowermost thread of the bolt adjacent the work simply by pressure on the spring nut itself and without requiring relative turning movement of the nut and bolt fastening members.

Further objects and advantages and other new and useful features of the invention will be apparent to those skilled in the art as the description thereof proceeds with reference to the accompanying drawing, for purposes of illustration but not of limitation, in which like reference characters designate like parts throughout the same, and in which:

Fig. 1 is a vertical sectional view, partly in elevation, showing the improved tool of the invention as applied to tension a spring nut assembled in initially applied position on a cooperating threaded bolt;

Fig. 2 is a similar view showing the tool as actuated to tension the spring nut in finally applied fastening position;

Fig. 3 is a sectional view along line 3—3 of Fig. 2, showing the spring nut in bottom plan and the relation of the tool head applied thereto;

Fig. 4 is a perspective view of the spring nut per se;

Fig. 5 is a sectional view illustrating the completed fastening installation of Fig. 2 upon removal of the tool, and, Fig. 6 is a similar view representing a completed fastening installation embodying a plain shank as in the case of rivet, nail, threadless connecting stud, or the like.

Referring now, more particularly, to the drawing, Figs. 1, 2 and 3 show a preferred form of tool construction for applying and tensioning a spring nut in the manner described. The tool may be provided for use either as a hand or machine operated implement to include a body, designated generally 10, provided with a tool shank 11 at one end for attachment to any suitable hand operated toolholder or to a chuck or socket carried by the ram or plunger of an assembling machine, as may be readily understood. The simplicity of the tool body 10 is such that it may be formed readily as an integral part of a unitary tool device including a handle, or, the tool shank 11 thereof otherwise provided with a screw-threaded or press-fitted connection with a separate toolholder in a relatively simple construction which is especially suited for economical quantity production at very low cost.

In a preferred construction, the leading end of the tool body 10 is provided with an inwardly tapering recess substantially in the shape of a truncated cone or pyramid outline, or the like, which defines an inclined circumferential wall 15 merging into a stud passage or bore 16 extending axially of the tool body. Adjacent said wall 15 of the recess, at the outer or leading end of the tool, there is thus defined a peripheral tool head portion 17 having an inner diameter 18 and related dimensions provided in accordance with the size of the spring nut with which the tool is intended to be used, as hereinafter more fully set forth.

Sheet metal or spring nut devices applied by the tool of the present invention are constructed from relatively thin sections of any suitable sheet metal, preferably spring metal such as spring steel, cold rolled steel or other metal having spring-like characteristics. The spring nuts are provided from blanks of various outlines, but preferably in the manner of a substantially rectangular section, as shown in Fig. 4, having a bolt opening and spaced parallel slits on either side thereof defining a pair of cooperating tongues 1 which are integral at their lower ends or bases 2, as represented in dotted lines, with the end portions 3 of the spring nut and project upwardly between the side or bridge portions 4 thereof.

The said end and bridge portions 3, 4, respectively, provide what may be termed, the body of the spring nut, which body is so formed in the stamping operation as to have a pronounced generally arched or concavo-convex configuration, when normally untensioned. The tongues 1 extend upwardly in a substantial ogee formation from such generally arched body with the extremities thereof so spaced as to lie on a helix corresponding to the pitch of the threads on a threaded bolt fastening for uniform threaded engagement therewith, or similarly, adapted for equal and uniform biting engagement with a threadless connecting stud, rivet, or the like. Said tongues 1, or similar stud engaging elements, otherwise are resilient and yieldable with respect to the generally arched base and relative to each other and accordingly, the spring nut may be applied easily and quickly in one direction to fastening engagement with an associated bolt or connecting stud in the manner of a substantial clutch, or the like, but resisting movement in an opposite direction toward loosening or removal from applied fastening position.

In the illustration of Fig. 1, the spring nut is shown in initially applied fastening position on a threaded bolt 20 securing the parts A, B of an installation. In advancing the spring nut to such initially applied fastening position, the extremities of the yieldable tongues 1 have an easy, ratchet-like action with the bolt threads to a point in which the end portions 3 thereof contact the face of the adjacent part A, with the body of the spring nut still possessed of its pronounced generally arched or concavo-convex configuration.

With said bolt 20 suitably supported in such initially applied fastening position, the spring nut is tightened or tensioned in fastening engagement therewith by compressing the generally arched or concavo-convex body thereof against the adjacent face of part A. The body of the spring nut is thus elongated with the end portions 3 forced outwardly in a manner whereby the tongues 1 which are integral therewith are capable of a further ratchet-like action with bolt threads to the point at which said tongues engage the lowermost effective thread on the projecting bolt shank adjacent the part A, substantially as shown in Fig. 2.

When the compressive force is removed from the spring nut device thus tensioned, the device attempts to assume its initial, generally arched or concavo-convex configuration in a substantial lifting force which is transmitted to the tongues 1 to urge the extremities thereof inwardly toward each other to cut into the adjacent bolt thread surfaces and root diameter of the bolt in locked fastening engagement therewith. At the same time, the body of the spring nut in such finally applied fastening position, exerts an axial drawing action on the bolt shank to tighten automatically the parts secured, while otherwise assuming the position of a slightly bowed or flat thin section in close proximity to the adjacent work surface A, with no parts projecting sufficiently for engagement by a conventional tool, and accordingly, cannot be removed readily except by a special tool by authorized persons. It will be understood that the bending moment which serves to lock the spring nut onto the threaded bolt in finally applied position is produced by the downward pressure of the engaged bolt thread on the extremities of the tongues, and the upward reaction pressure supplied to the tongues by the tensioned bridge and end portions 3, 4 in the compressed body of the spring nut attempting to assume its initial, normally untensioned, generally arched or concavo-convex configuration.

As previously set forth, the tool of the instant invention is especially constructed to be applied easily and quickly to a spring nut in any position and in a minimum of time and effort to ensure the provision of a tightened and locked fastening installation in which there is no tendency of the tongues of a spring nut to slip or loosen from fastening position. This takes place by reason of the fact that the pressure for advancing the spring nut to such fastening position is applied more directly to the bridge and end portions 3, 4 thereof to compress the same and thereby tension the device without deforming the tongue elements thereof out of their initial, essential ogee formation which affords the most effective fastening engagement. Thus, when a spring nut is applied to a threaded bolt or screw by the tool of the instant invention, the tongues or similar bolt engaging means are disposed in locked, fastening engagement with the lowermost effective thread on the bolt adjacent the work, as aforesaid. Similarly, as shown in Fig. 6, in the application of a spring nut to a threadless stud, rivet, or the like, pressure likewise is applied, more particularly, to the bridge portions 4, of the spring nut to flatten the generally arched body thereof against the adjacent work surface without deforming the tongues; and thus, when the tool is withdrawn and the attendant pressure removed from said compressed bridge portions 4, the tension stored therein causes the tongues to move inwardly toward each other in equal biting engagement with the bolt shank by substantial line contact, thereby ensuring a positive locking action at all times. Simultaneously, an axial drawing action or pull is exerted on the shank of the rivet or stud by the nut device attempting to assume its initial, generally arched configuration, such that the assembly not only is locked in finally applied fastening position, but the parts secured thereby are rigidly and tightly fastened in the installation under continuously effective spring tension.

With the foregoing in view, it will be understood that the tool of the present invention is constructed in accordance with the size and dimensions of the selected spring nut to be applied. The recess 15 is provided of such size that the inner diameter 16 of the adjacent tool head portion 17 approximates the distance between the bases 2 of the tongues or the distance between the points at which said tongues or stud engaging elements are integral with the end portions 3 of the spring nut. Thus, as shown in Figs. 1 and 3, said tool may be applied to the spring nut, in any position, to engage the same in the area of said bases 2 of the tongues 1 at spaced points on the adjacent side portions 4 and end portions 3 of the spring nut. The circumferential wall 15 of the recess clears the tongues 1, and accordingly, when pressure is exerted on the tool to compress the spring nut, the tool head portion 17 serves to flatten the spring nut against the adjacent work surface A, as shown in Fig. 2, without any damaging pressure on the tongues which would deform or mutilate the same out of their initial shape for engaging threadedly the bolt threads in the most effective manner. On being advanced to such tightened fastening position, the extremities of the yieldable tongues I have a substantial sliding, or ratchet-like action with the bolt threads which permits the same to be applied easily and quickly to the fastening position of Fig. 2, thus, reducing considerably the time ordinarily required for tightening and tensioning the spring nut on the bolt, as by a conventional turning or rotating action thereof. Compression of the spring nut in this way tensions the body thereof and disposes the tongues in uniform threaded engagement with the lowermost effective thread of the bolt adjacent the work, and when the tool is withdrawn, as shown in Fig. 5, the spring nut body attempts to assume its initial, generally arched or concavo-convex configuration causing the tongue extremities to cut into and become embedded in the bolt shank in locked relation thereto and otherwise exert an axial drawing action on the bolt to tighten automatically the parts secured thereby, as aforesaid.

Similarly, as shown in Fig. 6, in the application of a sheet metal or spring nut device to a threadless stud, bolt, rivet 25, or the like, the head portion 17 of the tool, in any position, contacts the end and bridge portions 3, 4, respectively, adjacent the bases 2, of the tongues to compress the spring nut to tensioned, finally applied fastening without any substantial pressure on the tongues. And when the tool is withdrawn and the attendant pressure removed, the spring nut naturally attempts to assume its initial, generally arched configuration, and in so doing urges the tongue extremities inwardly toward each other in substantially equal, line contact, biting engagement with the shank therebetween to provide a positive locked fastening engagement with the threadless bolt or stud and otherwise exert an axial drawing action thereon to ensure a rigid, tight installation at all times.

Though the stud or bolt thread engaging elements of the spring nut are shown and described as comprising cooperating yieldable tongues, or the like, other similar and related types of spring nut devices having equivalent forms of stud and bolt engaging means may be applied effectively to tensioned, locked fastening position on a threadless shank, shouldered stud, or conventional threaded bolt or screw by a tool constructed for operation and use therewith in accordance with the instant disclosure. In this respect, if necessary or desirable, the tool head portion, in any case, may be magnetized whereupon a spring nut device which must be applied in close quarters or under other difficult conditions, may be readily positioned on the tool head, substantially as shown in Fig. 3, and the tool then actuated to advance the spring nut to finally applied fastening position on the associated bolt or stud, all in one simple, expeditious operation, as and for the purposes described.

And while the tool of the instant invention has been described in detail with a specific example, such example is illustrative only since it will be apparent to those skilled in the art that other modifications within the spirit and scope of the invention may be constructed without departing from the teachings or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed is:

A tool for applying a sheet metal spring fastener to tightened, tensioned, fastening position on a cooperating bolt or stud associated with work to be secured, the fastener having a resilient body and yieldable bolt or stud engaging elements projecting therefrom, said tool comprising a body member provided at one end with a recess and a bolt or stud passage communicating therewith, said passage being adapted to receive the bolt or stud and said recess being adapted to receive and clear said projecting stud engaging elements of the fastener, and a peripheral substantially continuous tool head bordering said recess having an inner diameter approximating the distance between the bases of said stud engaging elements projecting from the fastener body, whereby said tool is adapted to be applied in any position to the fastener to advance the same to fastening position on a supported bolt or stud with said substantially continuous peripheral tool head thereof engaging the fastener body in the areas adjacent the bases of the stud engaging elements projecting therefrom and with the wall of said recess of the tool clearing said projecting stud engaging elements so as to permit free, unimpeded movement of said stud engaging elements to the fastening position of the fastener on the bolt or stud, and whereby said tool head is adapted to tighten and tension the fastener in such fastening position by compressing the fastener body against the adjacent work under substantially direct axial thrust of the tool without deforming said projecting stud engaging elements of the fastener out of most effective fastening engagement with said bolt or stud.

GEORGE A. TINNERMAN.